(12) United States Patent
Tsuda et al.

(10) Patent No.: US 10,720,833 B2
(45) Date of Patent: Jul. 21, 2020

(54) DC-DC CONVERTER

(71) Applicant: Murata Manufacturing Co., Ltd., Nagaokakyo-shi, Kyoto-fu (JP)

(72) Inventors: Kazunori Tsuda, Nagaokakyo (JP); Masanari Tago, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/373,722

(22) Filed: Apr. 3, 2019

(65) Prior Publication Data

US 2019/0229623 A1 Jul. 25, 2019

Related U.S. Application Data

(63) Continuation of application No. PCT/JP2017/035133, filed on Sep. 28, 2017.

(30) Foreign Application Priority Data

Oct. 6, 2016 (JP) .................................. 2016-198464
Nov. 24, 2016 (JP) .................................. 2016-227590

(51) Int. Cl.
*H02M 3/07* (2006.01)
*H02M 3/158* (2006.01)
*H02M 1/00* (2006.01)

(52) U.S. Cl.
CPC ............. *H02M 3/07* (2013.01); *H02M 3/158* (2013.01); *H02M 2001/007* (2013.01); *H02M 2001/0058* (2013.01); *H02M 2003/072* (2013.01)

(58) Field of Classification Search
CPC .. H02M 3/07; H02M 3/073; H02M 2003/072; H02M 2003/077; H02M 3/158; H02M 2001/007
See application file for complete search history.

(56) References Cited

U.S. PATENT DOCUMENTS 5,262,931 A * 11/1993 Vingsbo .................. H02M 3/07
323/222
5,610,807 A 3/1997 Kanda et al.
(Continued)

FOREIGN PATENT DOCUMENTS

JP 08-116679 A 5/1996
JP 08-297986 A 11/1996
(Continued)

OTHER PUBLICATIONS

Official Communication issued in International Patent Application No. PCT/JP2017/035133, dated Oct. 31, 2017.
(Continued)

*Primary Examiner* — Fred E Finch, III
(74) *Attorney, Agent, or Firm* — Keating & Bennett, LLP

(57) ABSTRACT

A DC-DC converter includes a capacitive power converter connected to a first terminal side, an LC circuit connected to a second terminal side and including an inductor and a second capacitor, and a control circuit that performs switching of a plurality of switch elements. The control circuit performs the switching at a switching frequency equal to or higher than a resonant frequency determined by the capacitance of the capacitive power converter and the capacitance and the inductance of the LC circuit, steps down an input DC voltage inputted to the first terminal, and outputs an output DC voltage from the second terminal.

20 Claims, 6 Drawing Sheets

(56) References Cited

U.S. PATENT DOCUMENTS

| | | | |
|---|---|---|---|
| 5,677,874 A | 10/1997 | Yamano | |
| 10,381,924 B2* | 8/2019 | Giuliano | H02M 3/00 |
| 10,389,235 B2* | 8/2019 | Giuliano | H02M 3/1582 |
| 2008/0157733 A1* | 7/2008 | Williams | H02M 3/07 323/266 |
| 2009/0059630 A1* | 3/2009 | Williams | H02M 3/07 363/60 |
| 2009/0278520 A1* | 11/2009 | Perreault | H02M 3/07 323/282 |
| 2011/0057640 A1* | 3/2011 | Cuk | H02M 3/005 323/311 |
| 2011/0169474 A1* | 7/2011 | Cuk | H02M 3/158 323/311 |
| 2011/0175591 A1* | 7/2011 | Cuk | H02M 3/07 323/311 |
| 2012/0014153 A1* | 1/2012 | Christoph | H02M 3/158 363/132 |
| 2012/0170334 A1* | 7/2012 | Menegoli | H02M 3/07 363/60 |
| 2014/0300328 A1* | 10/2014 | Giuliano | H02M 3/07 323/234 |
| 2016/0020693 A1* | 1/2016 | Ribarich | H02M 3/156 363/60 |
| 2016/0126833 A1* | 5/2016 | Yatsu | H02M 3/07 323/312 |
| 2016/0197552 A1* | 7/2016 | Giuliano | H02M 3/07 363/60 |
| 2017/0055322 A1* | 2/2017 | Jiang | H02M 3/07 |
| 2019/0089258 A1* | 3/2019 | Giuliano | H02M 3/073 |
| 2019/0190368 A1* | 6/2019 | Rainer | H02M 1/083 |
| 2019/0229616 A1* | 7/2019 | Illiano | H02M 1/083 |

FOREIGN PATENT DOCUMENTS

| | | |
|---|---|---|
| JP | 2009-219250 A | 9/2009 |
| JP | 2010-074930 A | 4/2010 |
| JP | 2010-178447 A | 8/2010 |
| WO | 2015/124514 A1 | 8/2015 |

OTHER PUBLICATIONS

Ng et al., "Switched Capacitor DC-DC Converter: Superior where the Buck Converter has Dominated", EECS Department University of California, Berkeley Technical Report, No. UCB/EECS-2011-94, Aug. 17, 2011, 141 pages.

* cited by examiner (Fs = 1/T)

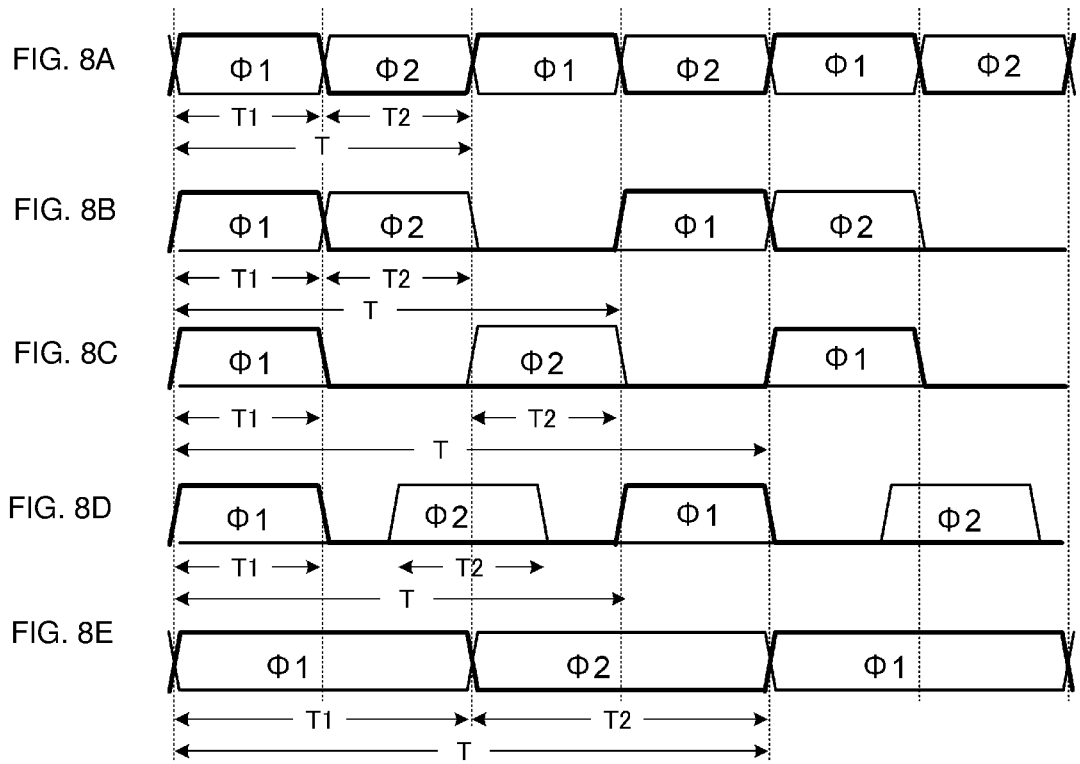
FIG. 8A
FIG. 8B
FIG. 8C
FIG. 8D
FIG. 8E
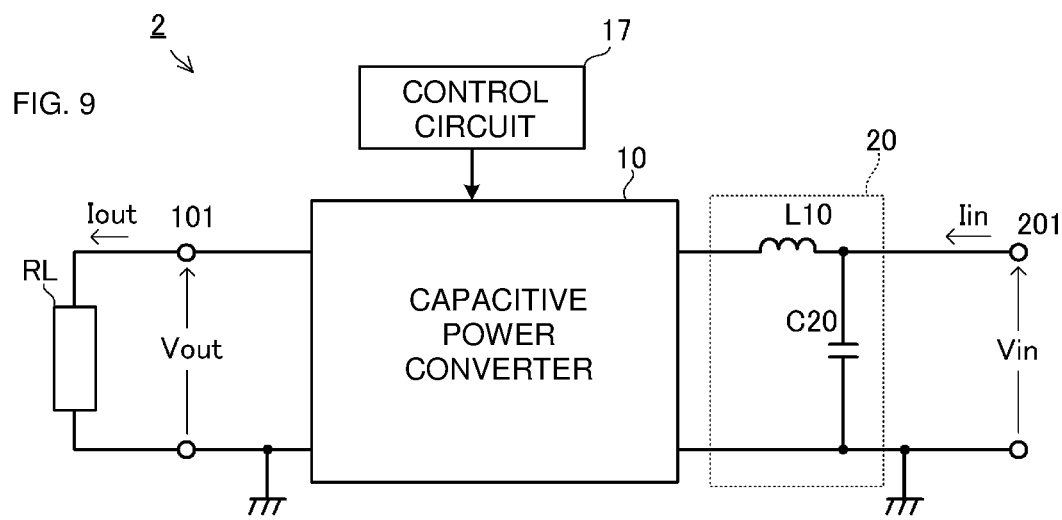
FIG. 9

DC-DC CONVERTER

CROSS REFERENCE TO RELATED APPLICATIONS

This application claims the benefit of priority to Japanese Patent Application No. 2016-198464 filed on Oct. 6, 2016 and Japanese Patent Application No. 2016-227590 filed on Nov. 24, 2016, and is a Continuation Application of PCT Application No. PCT/JP2017/035133 filed on Sep. 28, 2017. The entire contents of each of these applications are hereby incorporated herein by reference.

BACKGROUND OF THE INVENTION

1. Field of the Invention

The present invention relates generally to DC-DC (Direct Current-Direct Current) converters that include capacitive power converters.

2. Description of the Related Art

It is relatively easy to downsize a DC-DC converter including a capacitive power converter, which is also referred to as a switched capacitor circuit or a charge pump circuit, because such DC-DC converter eliminates the need for an inductive element such as a transformer or other suitable structure. This makes such a DC-DC converter suitable for use in small-size, low-power electric power supply devices.

For example, Vincent Wai-Shan Ng and Seth R. Sanders; "Switched Capacitor DC-DC Converter: Superior where the Buck Converter has Dominated"; EECS Department University of California, Berkeley Technical Report No. UCB/EECS-2011-94 Aug. 17, 2011 discloses a DC-DC converter including a capacitive power converter. The DC-DC converter described in this reference does not include an inductor.

Japanese Unexamined Patent Application Publication No. 8-116679 describes a DC-AC (Direct Current-Alternating Current) converter including a capacitive power converter. This Publication illustrates converting an inputted DC voltage into a sinusoidal AC voltage and outputting a converted voltage by utilizing a resonance between an inductor and a capacitor.

In low electric power use, heat generation due to power conversion efficiency of a DC-DC converter rarely poses an issue. Further, with advancements of integrated circuit technology, DC-DC converters including capacitive power converters, which are relatively easy to downsize, are increasingly prevalent in the field of low electric power.

On the other hand, in high electric power use, DC-DC converters including transformers or coils are typically used.

Recently, as capacitances of chip capacitors are becoming larger, it has become possible for DC-DC converters including capacitive power converters to handle higher electric power than before. Therefore, there will be a growing need to improve the power conversion efficiency even in DC-DC converters including capacitive power converters. In other words, in order to convert, for example, an electric power of several hundred mW or more by a capacitive power converter, it is necessary to improve the power conversion efficiency while taking heat generation into consideration.

On the other hand, when the electric power of several hundred mW or more is converted by a capacitive power converter, a large peak current is generated because this power converter is capacitive in nature, and it is necessary to alleviate a loss caused by such large peak current or necessary to reduce a loss caused by resonance phenomenon between the capacitance of the power converter and the parasitic inductance of the power converter.

SUMMARY OF THE INVENTION

DC-DC converters according to preferred embodiments of the present invention each include a capacitive power converter whose power conversion efficiency is improved while achieving downsizing.

A DC-DC converter according to a preferred embodiment of the present invention includes a capacitive power converter including an input portion, an output portion, a plurality of first capacitors, a plurality of switch elements, and a control circuit that controls switching of the plurality of switch elements, the capacitive power converter outputting an output voltage to the output portion after performing a step-down conversion of an input voltage inputted to the input portion by switching the plurality of switch elements and charging and discharging the plurality of first capacitors; and an LC circuit disposed at the output portion and including an inductor and a second capacitor, wherein the capacitive power converter includes at least a first connection state and a second connection state depending on a connection state of the plurality of switch elements, and the control circuit performs, in the first connection state, a control such that an operation is performed at a switching frequency equal to or higher than a first resonant frequency, the first resonant frequency being determined by capacitance of the capacitive power converter and capacitance and inductance of the LC circuit, and in the second connection state, a control such that an operation is performed at a switching frequency equal to or higher than a second resonant frequency, the second resonant frequency being determined by the capacitance of the capacitive power converter and the capacitance and inductance of the LC circuit.

A DC-DC converter according to a preferred embodiment of the present invention includes a capacitive power converter including an input portion, an output portion, a plurality of first capacitors, a plurality of switch elements, and a control circuit that controls switching of the plurality of switch elements, the capacitive power converter outputting an output voltage to the output portion after performing a step-up conversion of an input voltage inputted to the input portion by switching the plurality of switch elements and charging and discharging the plurality of first capacitors; and an LC circuit disposed at the input portion and including an inductor and a second capacitor, wherein the capacitive power converter includes at least a first connection state and a second connection state depending on a connection state of the plurality of switch elements, and the control circuit performs, in the first connection state, a control such that an operation is performed at a switching frequency equal to or higher than a first resonant frequency, the first resonant frequency being determined by capacitance of the capacitive power converter and capacitance and inductance of the LC circuit, and in the second connection state, a control such that an operation is performed at a switching frequency equal to or higher than a second resonant frequency, the second resonant frequency being determined by the capacitance of the capacitive power converter and the capacitance and inductance of the LC circuit.

A DC-DC converter according to a preferred embodiment of the present invention includes a capacitive power converter including a plurality of first capacitors, a plurality of switch elements, and a control circuit that controls switching of the plurality of switch elements, the capacitive power converter stepping up and stepping down a voltage by switching the plurality of switch elements and charging and discharging the plurality of first capacitors; and an LC circuit including an inductor and a second capacitor, the inductor including one end portion and another end portion, the one end portion being connected to the capacitive power converter, the another end portion being connected to the second capacitor, wherein the capacitive power converter includes at least a first connection state and a second connection state for electric power conversion, the capacitive power converter being controlled by the control circuit so as to convert an input voltage to an output voltage, in the first connection state, a time of the first connection state is shorter than one-half of a reciprocal of a first resonant frequency, the first resonant frequency being determined by a capacitance of the capacitive power converter and a capacitance and an inductance of the LC circuit, and in the second connection state, a time of the second connection state is shorter than one-half of a reciprocal of a second resonant frequency, the second resonant frequency being determined by the capacitance of the capacitive power converter and the capacitance and the inductance of the LC circuit.

According to the above described preferred embodiments, the loss caused by the large peak current generated from the capacitive power converter due to the inductance of the LC circuit is reduced or prevented. Further, by performing a switching operation, the generation of a reverse current due to a resonance phenomenon caused by the capacitance of the capacitive power converter and the capacitance and the inductance of the LC circuit is reduced or prevented. Accordingly, the power conversion efficiency is improved.

An inductive step-down converter may preferably be connected to and preceded by the capacitive power converter, the inductive step-down converter including the inductor and the second capacitor. According to this configuration, by allowing the step-down converter to take up part of the voltage conversion ratio of the capacitive power converter, the load of the capacitive power converter is able to be reduced, and as a result, a highly efficient power conversion with a higher voltage conversion ratio is able to be performed.

An inductive step-up converter may preferably be connected to and followed by the capacitive power converter, the inductive step-up converter including the inductor and the second capacitor. According to this configuration, by providing the step-up converter together and allowing the step-up converter to take up a portion of the voltage conversion ratio of the capacitive power converter, the burden of the capacitive power converter is able to be reduced, and as a result, a highly efficient power conversion with a higher voltage conversion ratio is able to be performed.

Preferably, the LC circuit is connected to a terminal on a lower voltage side of the capacitive power converter.

Preferably, the control circuit controls switching between the time of the first connection state and the time of the second connection state in response to load variation. According to this configuration, a high power conversion efficiency is maintained even when there is load variation.

Preferably, the first resonant frequency is equal or substantially equal to the second resonant frequency. According to this configuration, the power conversion efficiency is improved in both of the first connection state and the second connection state.

Preferably, the input voltage and the output voltage of the capacitive power converter are in an integer multiple relationship.

Preferably, the capacitive power converter is provided on a circuit board, and the inductor is made of a conductor pattern provided on the circuit board. This configuration facilitates a reduction of profile height while reducing the cost of the inductor.

Preferably, ON-time of the first connection state is equal or substantially equal to ON-time of the second connection state. This configuration facilitates a determination of an optimum value of the switching frequency.

Preferably, the control circuit performs an interleave control of the first capacitive power converter and the second capacitive power converter.

According to this configuration, by performing the interleave control, the peak current is able to be further reduced. Further, an equivalent switching frequency is doubled, and an output ripple voltage is able to be reduced or prevented.

According to preferred embodiments of the present invention, by performing switching at a switching frequency equal to or higher than a resonant frequency determined from the capacitance of the capacitive power converter and the capacitance and inductance of the LC circuit, the losses are alleviated, and the power conversion efficiency is improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 8A to 8E are time charts illustrating relationships between the time of the first connection state and the time of the second connection state in a DC-DC converter.

FIG. 9 is a block diagram of a DC-DC converter 2 according to a second preferred embodiment of the present invention.

DETAILED DESCRIPTION OF THE PREFERRED EMBODIMENTS

Figure 1:
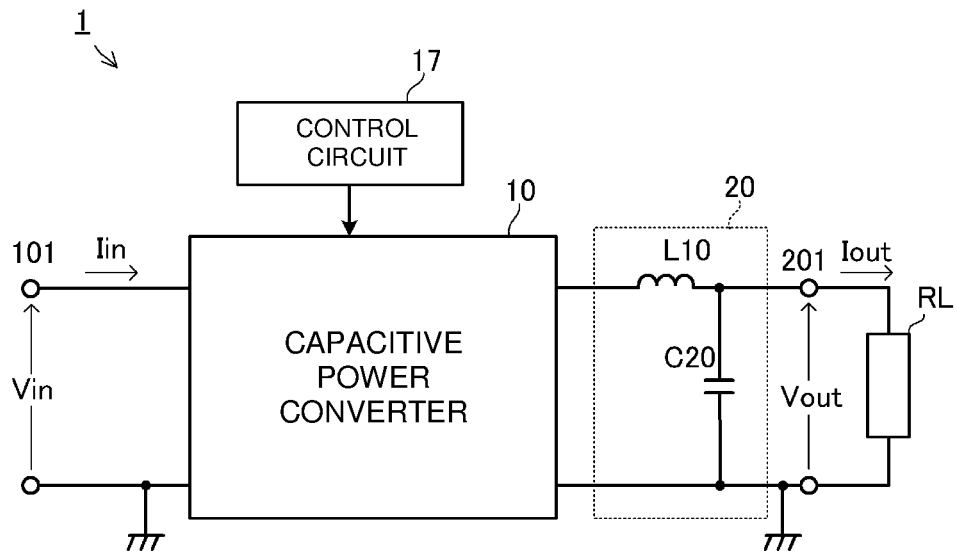
FIG. 1 is a block diagram of a DC-DC converter 1 according to a first preferred embodiment of the present invention.

A plurality of preferred embodiments of the present invention are described hereinafter with several specific examples and with referring to the drawings. The same reference signs designate same or similar portions or elements throughout the drawings. In considering descriptions of key points and ease of understanding, separate preferred embodiments are described for the sake of expedience. However, elements of different preferred embodiments may be partially exchanged or combined. In the description of the second preferred embodiment and subsequent preferred embodiments, matters common to the first preferred embodiment will not be described, and only points different from the first preferred embodiment will be described. Particularly, descriptions regarding similar functions and advantageous effects produced by similar elements will not be described in every preferred embodiment.

First Preferred Embodiment

FIG. 1 is a block diagram of a DC-DC converter 1 according to a first preferred embodiment of the present invention. The DC-DC converter 1 includes a capacitive power converter 10, an LC circuit 20, and a control circuit 17. The LC circuit 20 includes an inductor L10 and a capacitor C20. In the present preferred embodiment, the LC circuit 20 is connected to an output portion of the capacitive power converter 10. The capacitor C20 corresponds to a "second capacitor" of preferred embodiments of the present invention.

The DC-DC converter 1 steps down a DC voltage Vin of an input power supply connected to a first terminal 101 to a DC voltage Vout and provides the DC voltage Vout to a load RL. The DC-DC converter 1 receives an input current Iin and outputs an output current Iout to the load RL.

Figure 2:
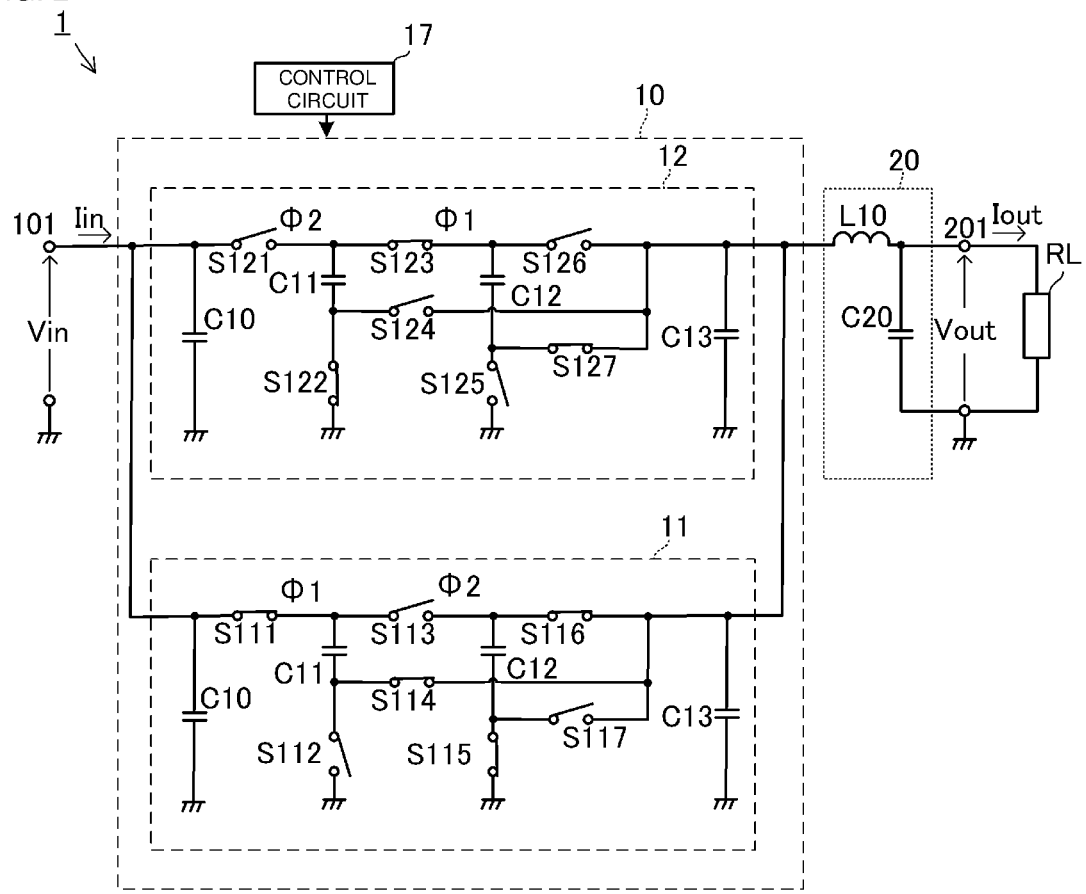
FIG. 2 is a circuit diagram of the DC-DC converter 1 according to the first preferred embodiment of the present invention.

FIG. 2 is a non-limiting example of a circuit diagram of the DC-DC converter 1. The capacitive power converter 10 includes a first capacitive power converter 11 and a second capacitive power converter 12 that are preferably connected in parallel. The first capacitive power converter 11 and the second capacitive power converter 12 include the same or substantially same configuration. In the first capacitive power converter 11, a plurality of first capacitors C10, C11, C12, and C13 and a plurality of switch elements S111, S112, S113, S114, S115, S116, and S117 are preferably disposed. In the second capacitive power converter 12, a plurality of first capacitors C10, C11, C12, and C13 and a plurality of switch elements S121, S122, S123, S124, S125, S126, and S127 are preferably disposed.

The capacitive power converter 10 is provided by mounting devices, such as an integrated circuit, a chip component, and other suitable component, for example, on a circuit board or other suitable structure. The inductor L10 and the capacitor C20 are, preferably, for example, individual chip components separately mounted on the circuit board. The first capacitors C10, C11, C12, C13 and the capacitor C20 are, preferably, for example, ceramic capacitors mounted on the circuit board. This configuration reduces the mounting area by using high-capacitance ceramic capacitors.

The control circuit 17 performs an interleave control of the first capacitive power converter 11 and the second capacitive power converter 12. In the example illustrated in FIG. 2, a state in which the switch elements S111, S114, S115, S116, S122, S123, and S127 are in ON state and the switch elements S112, S113, S117, S121, S124, S125, and S126 are in OFF state is defined as a first connection state Φ1. Further, a state in which the switch elements S111, S114, S115, S116, S122, S123, and S127 are in the OFF state and the switch elements S112, S113, S117, S121, S124, S125, and S126 are in the ON state is defined as a second connection state Φ2.

Further, a third connection state in which all of the switch elements are in the OFF state to avoid undesirable power dissipation, such as a shoot-through current and the like is able to be defined. This third state is also able to be used as an intermediate state at the time of transition from the first connection state to the second connection state or from the second connection state to the first connection state. In the present preferred embodiment, for the sake of simplicity of description, the third connection state is omitted from the following description.

Figure 3A:
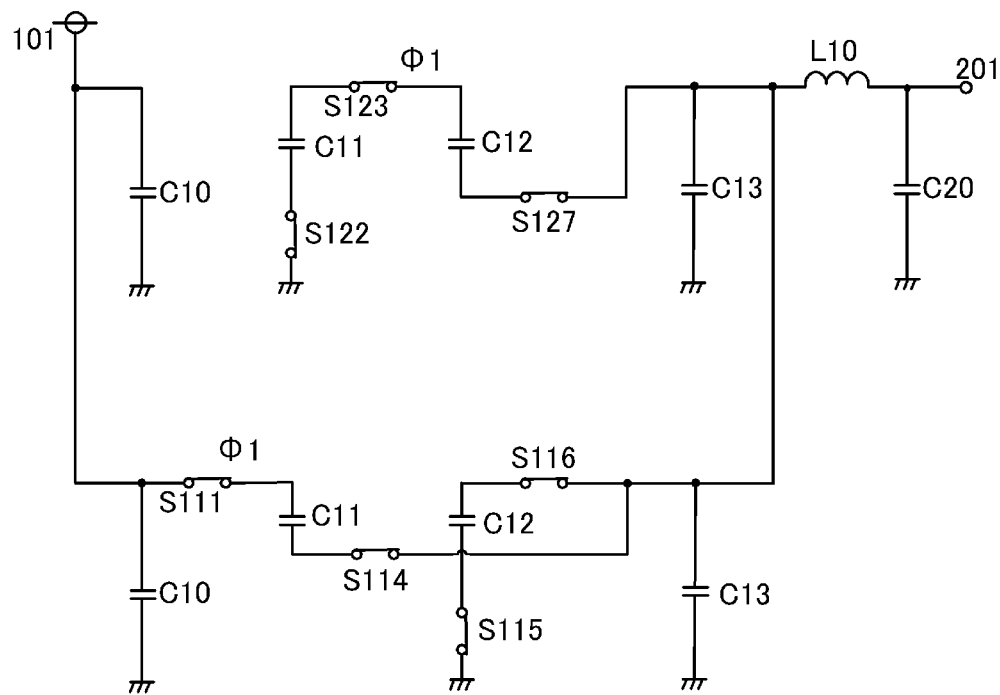
FIGS. 3A to 3C are circuit diagrams when the circuit illustrated in FIG. 2 is in a first connection state.

FIG. 3A is a circuit diagram when the circuit illustrated in FIG. 2 is in the first connection state Φ1.

Figure 3B:
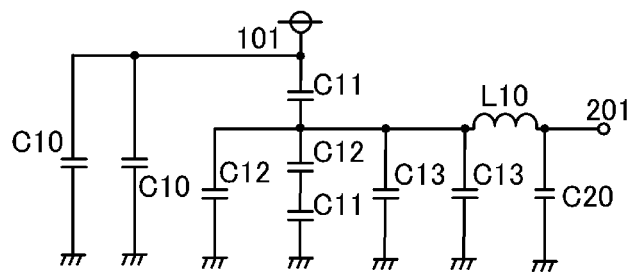

FIG. 3B is a circuit diagram in the case in which, in the circuit illustrated in FIG. 3A, the impedance of the power supply is high (having a certain value that is not negligible), and C10>>C11 does not hold in which C10 and C11 are capacitances of the capacitors C10 and C11, respectively.

Figure 3C:
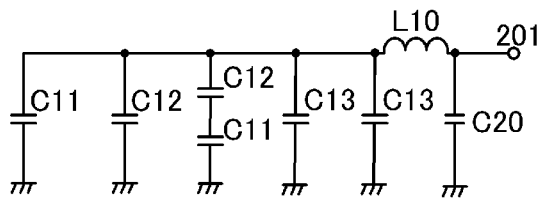

FIG. 3C is a circuit diagram in the case in which, in the circuit illustrated in FIG. 3A, the impedance of the power supply is sufficiently low. Further, FIG. 3C is also a circuit diagram in the case in which the capacitance of the capacitor C10 is sufficiently higher than the capacitance of the capacitor C11 (in the case in which C10>>C11). In other words, even in the case in which the impedance of the power supply has a certain value that is not negligible, if C10>>C11, the impedance of the power supply is effectively masked from the capacitor C10. Therefore, the circuit illustrated in FIG. 3A is equivalently represented by the circuit illustrated in FIG. 3C.

Note that, in the FIGS. 3B and 3C, an ON resistance RON of each switch element is a negligibly small value.

Figure 4:
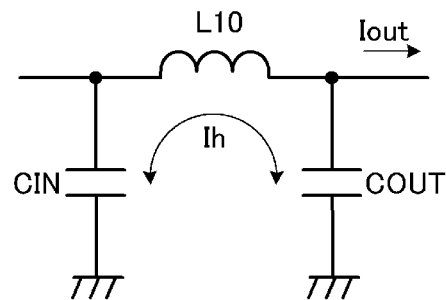
FIG. 4 is a diagram illustrating a resonant circuit of a DC-DC converter.

FIG. 4 is a circuit diagram that is a further composition of the circuit illustrated in FIG. 3B or 3C. As illustrated in FIG. 4, the capacitive power converter 10 and the LC circuit 20 define an LC resonant circuit in which a composite capacitor CIN is disposed at an input end of the inductor L10 and a capacitor COUT is disposed at an output end of the inductor L10. A resonant current Ih flows through this LC resonant circuit.

In the case in which the impedance of the power supply is high and the capacitance of the capacitor C10 is small (not C10>>C11), namely, in the case in which FIG. 3B is an equivalent representation, a capacitance Cin of the composite capacitor CIN is represented by the following equation:

$$Cin = C13 + C13 + \frac{1}{\left(\frac{1}{C12} + \frac{1}{C11}\right)} + C12 + \frac{1}{\left(\frac{1}{C11} + \frac{1}{(C10 + C10)}\right)} \qquad \text{Math. 1}$$

Further, in the case in which the power supply is an ideal power supply having a sufficiently low impedance or in the case in which the impedance of the power supply has a certain value that is not negligible but C10>>C11 is satisfied, namely, in the case in which FIG. 3C is an equivalent representation, the capacitance Cin of the composite capacitor CIN is represented by the following equation:

$$Cin = C13 + C13 + \frac{1}{\left(\frac{1}{C12} + \frac{1}{C11}\right)} + C12 + C11 \qquad \text{Math. 2}$$

Further, a resonant frequency Fh of the resonant circuit illustrated in FIG. 4 is obtained by the following equation:

$$Fh = \frac{1}{2\pi\sqrt{L\left(\frac{Cin * Cout}{Cin + Cout}\right)}}  \quad \text{Math. 3}$$

Note that, in consideration of ease of understanding, the first capacitive power converter 11 and the second capacitive power converter 12 are illustrated as independent circuits. However, capacitors connected in parallel (capacitors that are doubly connected) are able to be provided as a single capacitor. For example, the capacitors C10, C10 and the capacitors C13, C13 may be preferably replaced with corresponding single capacitors. Similarly, the switches that are preferably in a double relationship may be replaced with a single shared switch. These structures enable a reduced number of components.

Figure 5:
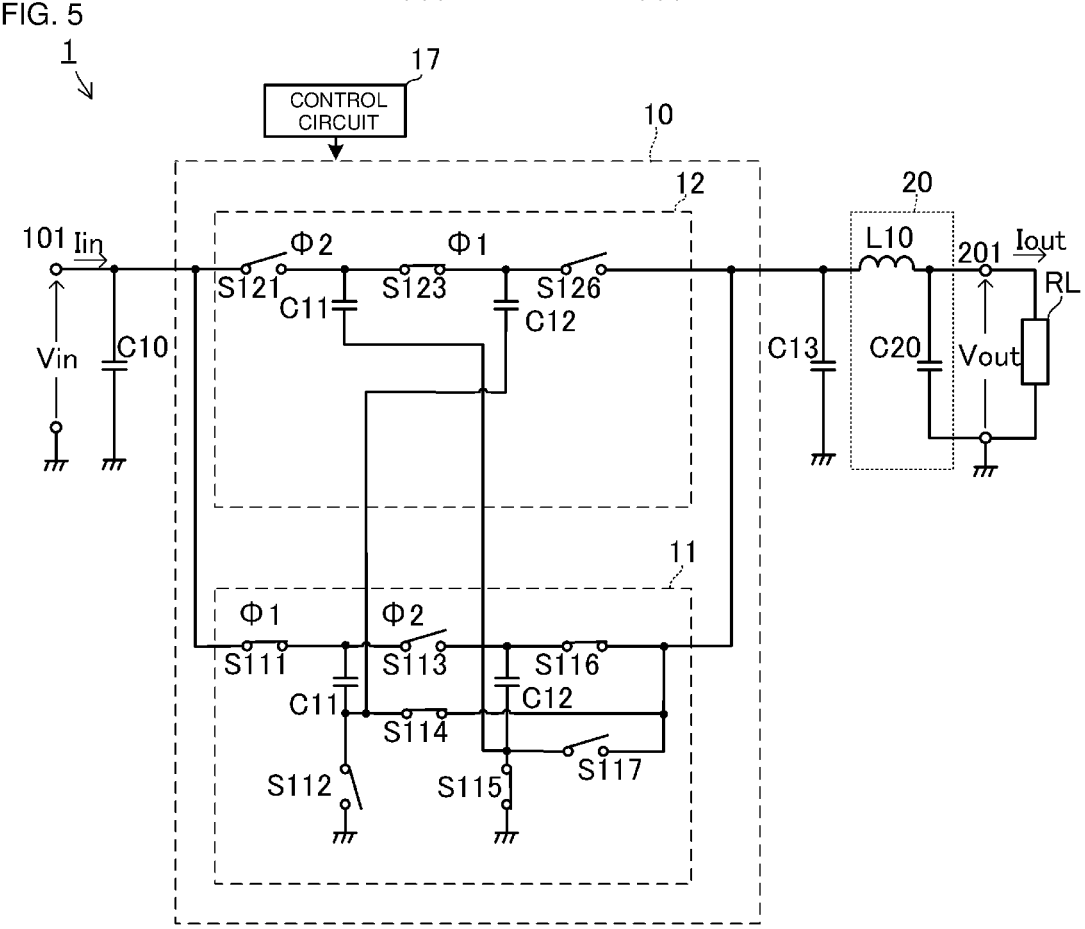
FIG. 5 is a circuit diagram of another DC-DC converter according to the first preferred embodiment of the present invention.

FIG. 5 is one non-limiting example of the circuit diagram of the DC-DC converter 1 and illustrates that an interleaving operation is able to be performed even without making the circuit a complete double configuration. In other words, the first capacitor C10 is shared as an input capacitor. The first capacitor C13 is shared as an output capacitor. Because the switch elements S112, S114, S115, and S117 generate positive and negative pulses, sharing is possible by changing a connection order of these switch elements.

Figure 6:
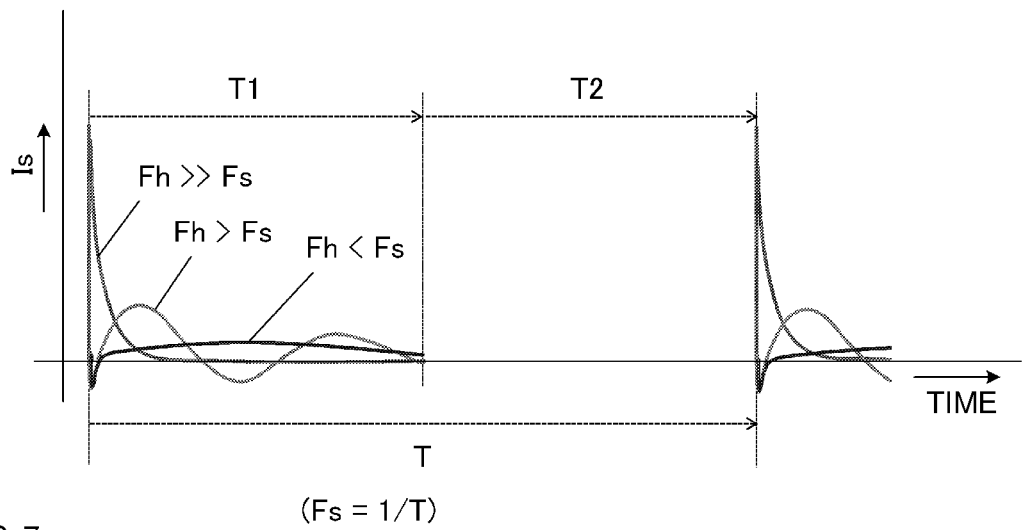
FIG. 6 is a waveform diagram illustrating a relationship between a resonant frequency, a switching period, and a switching current in a DC-DC converter.

FIG. 6 is a waveform diagram illustrating a relationship between a resonant frequency Fh, a switching period T, and a switching current Is in the DC-DC converter 1. Here, the switching period T is a total value of time T1 of the first connection state Φ1 and time T2 of the second connection state Φ2.

A switching frequency Fs is, for example, the reciprocal of the switching period T. In the case in which a blank time, for example, during which all of the switches are turned off, is not considered, then T=T1+T2, and Fs=1/T is maintained. For simplicity of explanation, this condition is assumed in the following description. The switching current Is in FIG. 6 simulates a waveform of a current flowing through the switch element S111. Here, a direction toward the output is assumed to be positive.

In the case in which electric power is transmitted from the capacitive power converter 10 to a capacitive or resistive load RL, the resonant frequency Fh becomes higher or substantially higher than the switching frequency Fs (Fh>>Fs), and a very large peak current is generated as illustrated in FIG. 6. This increases the loss. On the other hand, when the inductor L10 is connected to the second terminal 201 side, an induction property emerges, and the resonant frequency Fh becomes slightly higher than the switching frequency Fs (Fh>Fs). Thus, as illustrated in FIG. 6, a period of time during which the switching current Is swings to negative polarity is produced. Further, when the inductance of the inductor L10 is increased, the resonant frequency Fh becomes lower than the switching frequency Fs (Fh<Fs), and as illustrated in FIG. 6, the switching current Is does not have the negative current time and remains at a small or substantially small value.

The output current of the capacitive power converter is an entire or substantially an entire current flowing through each switch and is obtained from an average value of the entire or substantially the entire current. Regarding the three conditions in FIG. 6, in the case in which the entire or substantially the entire output currents of the DC-DC converter are all Iout, an average current value of each waveform representing the current of the switch element S111 is about one-sixth of Iout. Therefore, in the case in which the current waveform in FIG. 6 swings to negative, namely, in the case in which a reverse direction current flows, there is a need to compensate with an equivalent positive direction current during the time T1 of the first connection state Φ1. Therefore, the absolute value of the current flowing through the switch increases, and this also increases heat loss of the switch. As a result, the efficiency is reduced.

Figure 7:
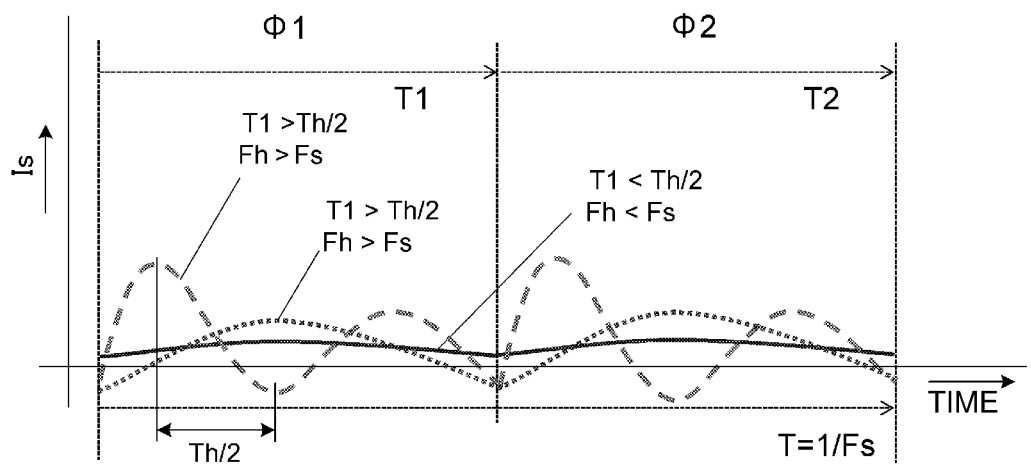
FIG. 7 is a waveform diagram illustrating a relationship between time of a first connection state, time of a second connection state, and the switching current in a DC-DC converter.

In the circuit configuration according to a preferred embodiment of the present invention, the current caused by an LC resonance phenomenon is able to be effectively checked by observing the current flowing through the inductor. A non-limiting example of its waveform is illustrated in FIG. 7. In FIG. 7, an average current value of each waveform is equal or substantially equal to the output current of the DC-DC converter. On the other hand, depending on a relationship between the resonant frequency Fh and the switching frequency Fs, as in FIG. 6, each waveform has a different shape and a different crest value.

Specifically, under a condition T1>Th/2 in which the time T1 of the first connection state Φ1 is larger than one-half of the resonant period Th which is the reciprocal of the resonant frequency Fh, there is a section in which the current flows in the reverse direction during the resonant period Th which is the reciprocal of the resonant frequency Fh. In the present configuration, two connection states are preferably included for electric power transmission. Thus, it is necessary to meet a condition T1<Th/2 in which the time T1 of the first connection state Φ1 is smaller than one-half of the resonant period Th which is the reciprocal of the resonant frequency Fh. Further, it is necessary to meet a condition T2<Th/2 in which the time T2 of the second connection state Φ2 is smaller than one-half of the resonant period Th which is the reciprocal of the resonant frequency Fh. Note that these do not necessarily apply in a no-connection state, such as a dead time, for example.

As described above, in the case in which the resonant frequency Fh is higher than the switching frequency Fs, the amount of the current flowing through the switch element increases because of the reverse direction current and the forward direction current, and the loss increases. Heat loss PLS of a switch element is the time integral of a value obtained by multiplying the ON resistance RON of the switch by the square of the current Is flowing through the switch element. In other words, it is not enough to reduce the current peak by simply providing a filter and other suitable structure. Because the inductor is installed or because of a parasitic inductance, there may be a case in which the loss increases. The power conversion efficiency is able to be improved by appropriately controlling a ON-time TON of the switch element based on the calculation of the resonant frequency Fh according to the present preferred embodiment.

Therefore, in the present preferred embodiment, the control circuit 17 is configured such that switching is performed at the switching frequency Fs that is equal to or higher than the resonant frequency Fh determined by the capacitance of the capacitive power converter 10 and the capacitance and inductance of the LC circuit 20. In other words, the switching is performed at a switching period that makes a ON period TN equal to or less than Th/2, one-half of the resonant period. Here, N is an integer representing the connection state of the capacitive power converter, and in this example, TN is preferably T1 or T2, for example.

In the case in which the switching frequency Fs is lower than the resonant frequency Fh, as the reverse direction current flows, the forward direction current equivalent to the reverse direction current flows, and the power conversion efficiency decreases. In the case in which the switching frequency Fs is equal to or higher than the resonant frequency Fh, no reverse direction current flows, and the power conversion efficiency is improved. Similarly, if this is translated into the time axis, the efficiency is maximally improved when the switching period T is shorter than one-half of the resonant period Th.

FIGS. 8A to 8E are time charts illustrating examples of relationships between the time of the first connection state Φ1 and the time of the second connection state Φ2 in the DC-DC converter 1. FIG. 8A is a non-limiting example in which the time of the first connection state Φ1 is equal or substantially equal to the time of the second connection state Φ2 and the switching period T is a total value of the time of the first connection state Φ1 and the time of the second connection state Φ2. In other words, the duty ratio of the switching is preferably, for example, about 0.5. In this case, the switching frequency Fs is preferably higher than the resonant frequency Fh. On the other hand, as illustrated in FIGS. 8B, 8C and 8D, it is possible to set on-duty at a value, preferably, less than about 50%, for example, by inserting a blank time such as a dead time, for example. In this case, as described above, the switching period T is preferably shorter than one-half of the resonant period Th.

Devices that improve the efficiency by varying the switching frequency depending on a load condition of the DC-DC converter are generally used for inductive switching regulators. Similarly, in the present preferred embodiment, a loss relating to switch driving is able to be reduced by lowering the switching frequency in, for example, a light load condition, and the efficiency is able to be improved. Even in such a case, it is important to maintain the foregoing relationship between the switching period and the resonant period.

In addition to the foregoing non-limiting example method, as in FIG. 8E, there is a non-limiting example of a method of increasing the switching period while maintaining the duty ratio of the switching at about 0.5 by increasing both of the time of the first connection state Φ1 and the time of the second connection state Φ2. This control method may be within the range in which the relationship between the switching frequency Fs and the resonant frequency Fh is able to be maintained.

Second Preferred Embodiment

FIG. 9 is a block diagram of a DC-DC converter 2 according to the second preferred embodiment of the present invention. In the present preferred embodiment, an LC circuit 20 is connected to an input portion of a capacitive power converter 10. The DC-DC converter 2 steps up a DC voltage Vin of an input power supply connected to a second terminal 201 to a DC voltage Vout and provides the DC voltage Vout to a load RL. The DC-DC converter 2 receives an input current Iin and outputs an output current Iout to the load RL.

The same or substantially the same circuit as the circuit illustrated in FIG. 2 is able to be used for the capacitive power converter 10, except that the relationship of input and output of the capacitive power converter 10 illustrated in FIG. 2 is reversed.

Third Preferred Embodiment

Figure 10:
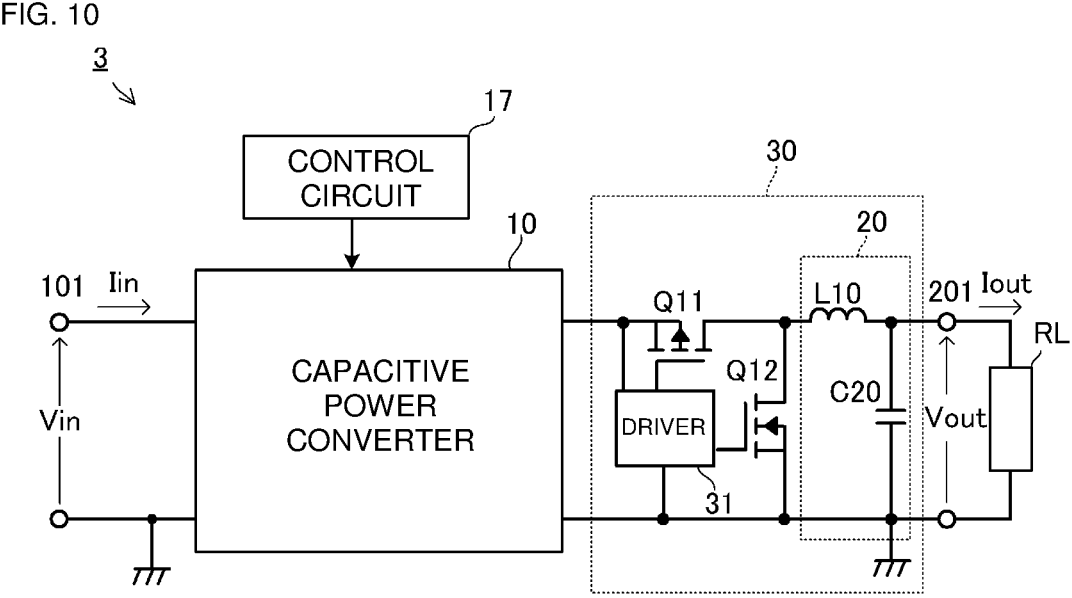
FIG. 10 is a block diagram of a DC-DC converter 3 according to a third preferred embodiment of the present invention.

FIG. 10 is a block diagram of a DC-DC converter 3 according to the third preferred embodiment of the present invention. In the present preferred embodiment, an inductive step-down converter 30 is connected to and preceded by a capacitive power converter 10. An LC circuit 20 includes an inductor and a capacitor that are preferably included in the inductive step-down converter 30.

The inductive step-down converter 30 includes a rectifying switch element Q11, a commutation switch element Q12, an inductor L10, a capacitor C20, and a driver 31. The rectifying switch element Q11 is preferably, for example, a p-type metal-oxide-semiconductor field-effect transistor ("MOS-FET"). The commutation switch element Q12 is preferably, for example, an n-type MOS-FET. The driver 31 performs switching of the rectifying switch element Q11 and the commutation switch element Q12 in an alternating manner. Note that a plurality of the inductive step-down converters 30 may preferably be connected in parallel and operated in an interleaving manner.

FIG. 10 illustrates a non-limiting example in which the inductive step-down converter 30 is connected to and preceded by the capacitive power converter 10. Alternatively, an inductive step-up converter may preferably be connected to and followed by the capacitive power converter 10. In other words, in the DC-DC converter 2 illustrated in FIG. 9, an inductive step-up converter is preferably connected to and followed by the capacitive power converter 10. In this case, the LC circuit 20 may preferably include an inductor and a capacitor that are included in the inductive step-up converter.

Further, in each preferred embodiment described above, an example is described in which two Dickson circuits are preferably connected in parallel and driven in an interleaving manner. Alternatively, a single series-parallel charge pump circuit may preferably be used. Further, in addition to the single-phase or two-phase, it is also possible to provide a multi-phase capacitive power converter.

In the DC-DC converter illustrated in each preferred embodiment described above, for the sake of simplicity of description, an example is described in which the LC circuit 20 includes a single inductor and a single capacitor. Alternatively, a plurality of inductors and a plurality of capacitors may preferably be used. Further, an example is described in which the capacitive power converter 10 is provided on a circuit board on which chip components are mounted. Alternatively, a portion or all of the capacitors that are included in the capacitive power converter 10 may preferably be mounted inside a multi-layer board.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A DC-DC converter comprising:
a capacitive power converter including an input portion, an output portion, a plurality of first capacitors, a plurality of switch elements, and a control circuit, the capacitive power converter outputting an output voltage to the output portion after performing a step-down conversion of an input voltage inputted to the input portion by switching the plurality of switch elements and charging and discharging the plurality of first capacitors;
an LC circuit disposed at the output portion and including an inductor and a second capacitor; and a third capacitor connected to the LC circuit; wherein
the third capacitor is connected to an input end of the inductor via no switches;
the capacitive power converter includes at least a first connection state and a second connection state depending on a connection state of the plurality of switch elements; and
the control circuit controls switching of the plurality of switch elements, such that
(i) in the first connection state, an operation is performed at a switching frequency equal to or higher than a first resonant frequency, the first resonant frequency being determined by a capacitance of the capacitive power converter during the first connection state and a capacitance and an inductance of the LC circuit, and
(ii) in the second connection state, an operation is performed at a switching frequency equal to or higher than a second resonant frequency, the second resonant frequency being determined by a capacitance of the capacitive power converter during the second connection state and the capacitance and the inductance of the LC circuit.

2. The DC-DC converter according to claim 1, further comprising an inductive step-down converter connected to and preceded by the capacitive power converter, the inductive step-down converter including the inductor and the second capacitor.

3. The DC-DC converter according to claim 1, wherein the LC circuit is connected to a terminal on a lower voltage side of the capacitive power converter.

4. The DC-DC converter according to claim 1, wherein the first resonant frequency is equal or substantially equal to the second resonant frequency.

5. The DC-DC converter according to claim 1, wherein the capacitive power converter is provided on a circuit board, and the inductor is made of a conductor pattern provided on the circuit board.

6. The DC-DC converter according to claim 1, wherein an ON-time of the first connection state is equal or substantially equal to an ON-time of the second connection state.

7. The DC-DC converter according to claim 1, wherein
the capacitive power converter includes a first capacitive power converter and a second capacitive power converter that are equivalent to one another; and
the control circuit performs an interleave control of the first capacitive power converter and the second capacitive power converter.

8. A DC-DC converter comprising:
a capacitive power converter including an input portion, an output portion, a plurality of first capacitors, a plurality of switch elements, and a control circuit, the capacitive power converter outputting an output voltage to the output portion after performing a step-up conversion of an input voltage inputted to the input portion by switching the plurality of switch elements and charging and discharging the plurality of first capacitors;
an LC circuit disposed at the input portion and including an inductor and a second capacitor; and
a third capacitor connected to the LC circuit; wherein
the third capacitor is connected to an input end of the inductor via no switches;
the capacitive power converter includes at least a first connection state and a second connection state depending on a connection state of the plurality of switch elements; and the control circuit controls switching of the plurality of switch elements, such that
(i) in the first connection state, an operation is performed at a switching frequency equal to or higher than a first resonant frequency, the first resonant frequency being determined by a capacitance of the capacitive power converter during the first connection state and a capacitance and an inductance of the LC circuit, and
(ii) in the second connection state, an operation is performed at a switching frequency equal to or higher than a second resonant frequency, the second resonant frequency being determined by a capacitance of the capacitive power converter during the second connection state and the capacitance and the inductance of the LC circuit.

9. The DC-DC converter according to claim 8, wherein
the capacitive power converter includes a first capacitive power converter and a second capacitive power converter that are connected in parallel; and
the first capacitive power converter and the second capacitive power converter include the same or substantially the same configuration.

10. The DC-DC converter according to claim 8, wherein the control circuit controls switching between a time of the first connection state and a time of the second connection state in response to load variation.

11. The DC-DC converter according to claim 8, wherein the first resonant frequency is equal or substantially equal to the second resonant frequency.

12. The DC-DC converter according to claim 8, wherein the capacitive power converter is provided on a circuit board, and the inductor is made of a conductor pattern provided on the circuit board.

13. The DC-DC converter according to claim 8, wherein an ON-time of the first connection state is equal or substantially equal to an ON-time of the second connection state.

14. The DC-DC converter according to claim 8, wherein
the capacitive power converter includes a first capacitive power converter and a second capacitive power converter that are equivalent to one another; and
the control circuit performs an interleave control of the first capacitive power converter and the second capacitive power converter.

15. A DC-DC converter comprising:
a capacitive power converter including a plurality of first capacitors, a plurality of switch elements, and a control circuit that controls switching of the plurality of switch elements, the capacitive power converter stepping up or stepping down a voltage by switching the plurality of switch elements and charging and discharging the plurality of first capacitors;
an LC circuit including an inductor and a second capacitor, the inductor including one end portion and another end portion, the one end portion being connected to the capacitive power converter, the another end portion being connected to the second capacitor; and
a third capacitor connected to the LC circuit; wherein
the third capacitor is connected to the one end portion of the inductor via no switches;
the capacitive power converter includes at least a first connection state and a second connection state for electric power conversion, the capacitive power converter being controlled by the control circuit so as to convert an input voltage to an output voltage;
in the first connection state, a time of the first connection state is shorter than one-half of a reciprocal of a first resonant frequency, the first resonant frequency being determined by a capacitance of the capacitive power converter during the first connection state and a capacitance and an inductance of the LC circuit; and in the second connection state, a time of the second connection state is shorter than one-half of a reciprocal of a second resonant frequency, the second resonant frequency being determined by a capacitance of the capacitive power converter during the second connection state and the capacitance and the inductance of the LC circuit.

16. The DC-DC converter according to claim 15, wherein the control circuit controls switching between the time of the first connection state and the time of the second connection state in response to load variation.

17. The DC-DC converter according to claim 15, wherein the first resonant frequency is equal or substantially equal to the second resonant frequency.

18. The DC-DC converter according to claim 15, wherein the capacitive power converter is provided on a circuit board, and the inductor is made of a conductor pattern provided on the circuit board.

19. The DC-DC converter according to claim 15, wherein an ON-time of the first connection state is equal or substantially equal to an ON-time of the second connection state.

20. The DC-DC converter according to claim 15, wherein the capacitive power converter includes a first capacitive power converter and a second capacitive power converter that are equivalent to one another; and the control circuit performs an interleave control of the first capacitive power converter and the second capacitive power converter.

* * * * *